United States Patent

Madsen

[15] 3,663,814
[45] May 16, 1972

[54] SYSTEM FOR DELINEATING SELECTIVE RESPONSE OF A MATERIAL TO RADIATION IN PRESENCE OF VISIBLE ILLUMINATION

[72] Inventor: Andrew Madsen, Alamo, Calif.

[73] Assignee: Resource Data Corporation, Denver, Colo.

[22] Filed: Jan. 29, 1969

[21] Appl. No.: 795,119

[52] U.S. Cl. .................. 250/83.3 UV, 250/71 R, 250/83.6 S
[51] Int. Cl. ........................................................ G01n 21/00
[58] Field of Search .............. 250/83.3 UV, 83.6 S, 83.3, 71, 250/83.3 IR; 356/151; 128/2, 2.1

[56] References Cited

UNITED STATES PATENTS

| | | | |
|---|---|---|---|
| 2,617,945 | 11/1952 | Lord et al. | 250/83.6 |
| 3,076,189 | 1/1963 | Goddard | 250/83.3 |
| 3,076,961 | 2/1963 | Bibbero | 250/83.3 |
| 3,305,089 | 2/1967 | Fraenkel | 250/71 X |
| 3,444,517 | 5/1969 | Rabinow | 250/71 X |
| 3,501,639 | 3/1970 | Monroe | 250/71 X |

OTHER PUBLICATIONS

Brown, Review of Scientific Instruments Vol. 34 Number 4, "Simplified System for the Measurement of Fluorescence Lifetimes Using the Stroboscopic Method." pgs. 414, 415

Primary Examiner—Archie R. Borchelt
Attorney—Flehr, Hohbach, Test, Albritton & Herbert

[57] ABSTRACT

A pulsed visible illumination source illuminates a material to allow, for example, a helicopter pilot to fly over the surface of the earth in darkness. The visible light is interrupted to allow a pulsed ultraviolet source to stimulate luminescent reradiation from the material which reradiation is detected by observers and/or cameras. Both observers and camera are shielded by goggles or shutters so that the stimulated luminescence produced by the ultraviolet is not masked by the visible illumination. Such shutters are synchronized with the visible illumination pulses.

4 Claims, 2 Drawing Figures

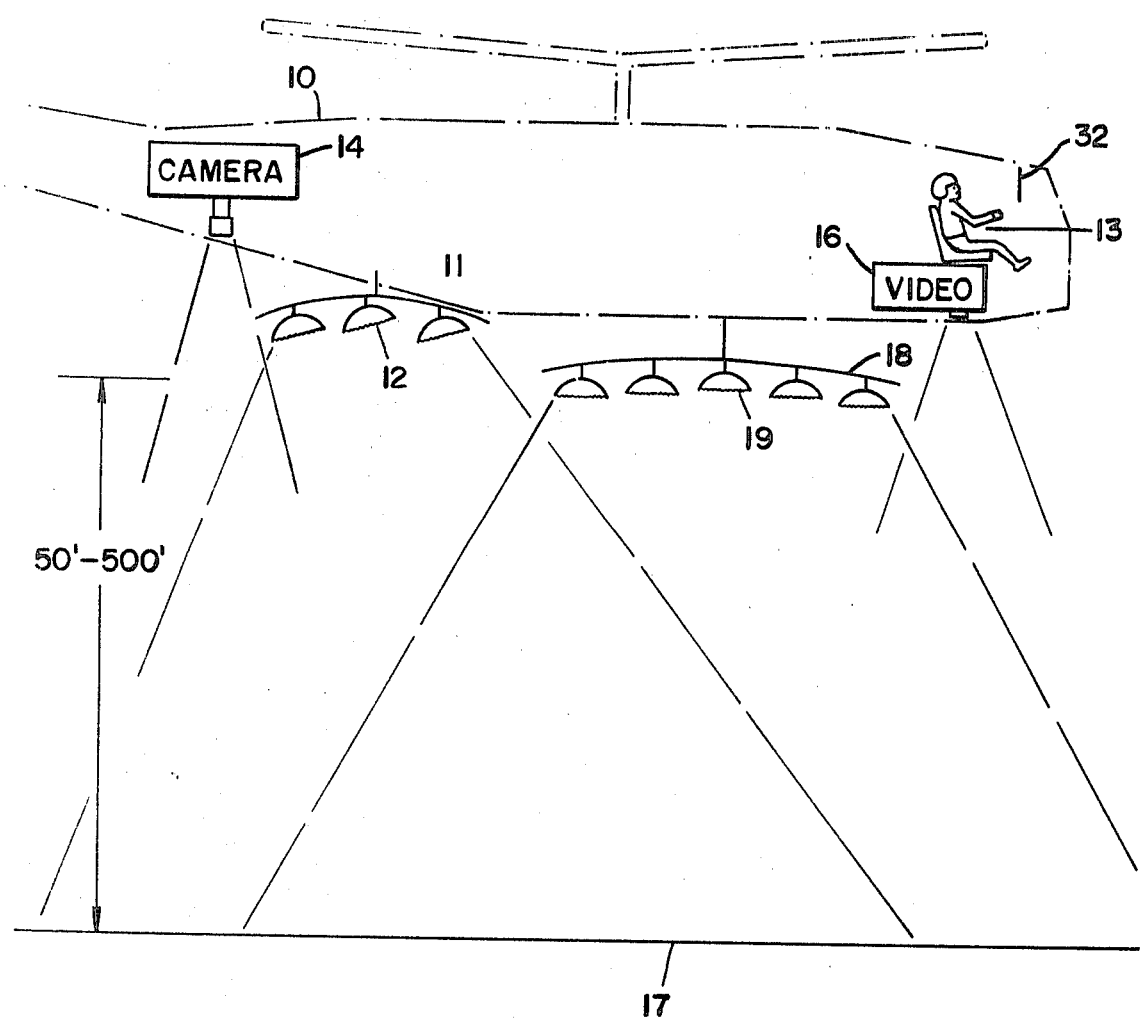
FIG_1
INVENTOR.
ANDREW MADSEN

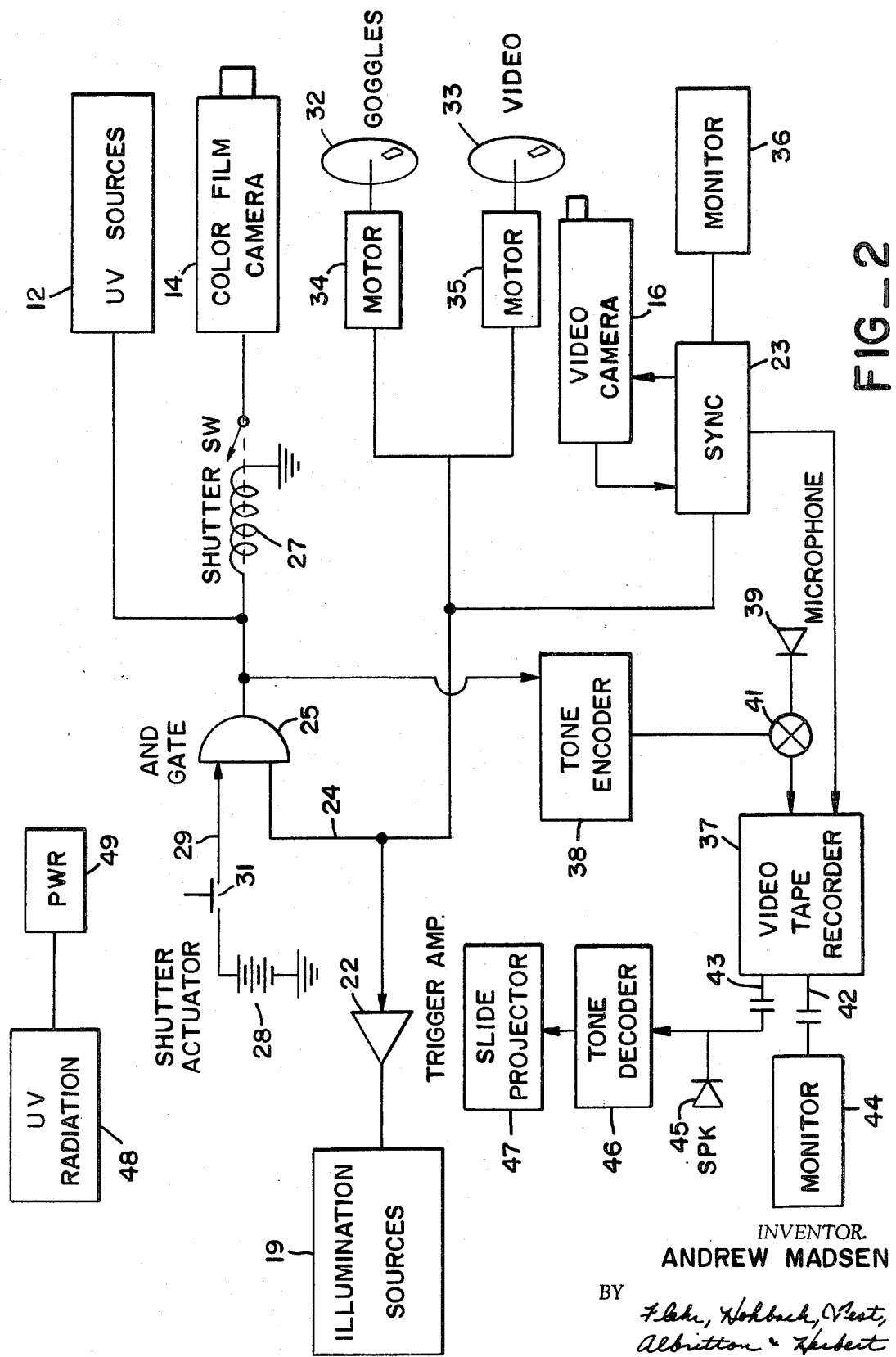

SYSTEM FOR DELINEATING SELECTIVE RESPONSE OF A MATERIAL TO RADIATION IN PRESENCE OF VISIBLE ILLUMINATION

BACKGROUND OF THE INVENTION

The present invention is directed to a system for delineating selective response of a material to radiation in the presence of visible illumination and more particularly to a system useful for geologic exploration, in the sorting of materials, and as an aid in surgery.

Airborne survey techniques, such as disclosed in U.S. Pat. No. 3,043,908, entitled "Fluorographic System for Aerial Survey," with the same inventor as the present application, have been used to locate and define surface and subsurface mineral deposits. The subtle influence of such deposits when selectively enhanced by ultraviolet radiation produces a luminescent display of spectral signatures and patterns indicative of the types of mineral deposits present.

Both radioactivity and trace elements are one of the prime reasons for the occurrence of luminescence. Since both factors often have an intimate relationship to intrusive rocks and hydrothermal ore bodies, it can be expected that luminescent minerals should occur in a similar intimate relationship.

Heavy metals, as well as uranium, phosphates and rare earth elements, may be found by the above technique. Hydrocarbon deposits of certain types are also subject to surface fluoraphic detection.

As described in the foregoing patent, the earth's surface is surveyed by mounting a controlled source of ultraviolet radiation in an aircraft which then flies a specific search pattern. The luminescence or fluorescence of the earth's surface caused by the ultraviolet radiation is then recorded and analyzed.

While the above technique has proved useful, relatively high intensities of ultraviolet radiation are required. This is especially in view of the necessity of operating at night and at high altitudes. Darkness is necessary since visible illumination has a masking effect on the luminescence and/or fluorescence. Adoption of the technique in other fields has been hindered by the darkness requirement.

OBJECT AND SUMMARY OF THE INVENTION

It is a general object of the invention to provide a system for delineating the selective response of a material to radiation in the presence of visible illumination.

It is another object of the invention to provide a system as above which is useful for geologic exploration, in the sorting of materials, and as an aid in surgery.

In accordance with the above objects, there is provided a system for delineating the selective response of a material to impinging radiation for visibly illuminating the material. The system comprises a first source of electromagnetic radiation directed toward the material for visibly illuminating it. This radiation has frequencies lying within a predetermined electromagnetic frequency spectrum. A second source of electromagnetic radiation is directed towards the material for causing it to selectively reradiate electromagnetic energy in a spectrum which overlaps with said predetermined frequency spectrum or with reradiation from said material caused by said first source. Means are provided for intermittently interrupting the directed radiation from the first source towards said material. Means are provided for receiving the selective reradiation from the material during the interruption of the first source.

BRIEF DESCRIPTION OF THE DRAWINGS

FIG. 1 is a schematic view in section of a helicopter embodying the system of the present invention and illustrating a survey of the surface of the earth.

FIG. 2 is a schematic block diagram of a system embodying the present invention.

DETAILED DESCRIPTION OF THE PREFERRED EMBODIMENT

Referring now to FIG. 1, there is shown a helicopter 10 which may be, for example, a Bell Jet Ranger. Mounted in a pod 11 attached to the underside of the helicopter is a first source of electromagnetic radiation which produces ultraviolet radiation. Pod 11 includes several luminars 12 to produce the desired intensity of radiation. The ultraviolet radiation produces overlapping beams and is canted 15° forward to allow a convenient spacial relationship to a human observer 13 seated in the front of the helicopter, film camera 14, and video camera 16.

Visible illumination of the ground terrain designated 17 is produced by a second pod 18 which has several visible illumination sources 19 grouped together in aligned reflectors. These would normally be of the pulse capacitor discharge type. Helicopter 10 would normally fly in a predetermined survey pattern above the surface of the earth at altitudes of from 50 to 500 feet, depending upon the intensity of ultraviolet radiation desired on the ground surface 17 and the obstacles present near the ground surface to thereby provide information as to the geologic nature of surface 17.

As described more completely in the above mentioned Madsen patent, the principal application of the fluorographic survey technique is in the detection of hydrocarbon compounds, such as petroleum deposits associated with a submerged source. Since geological petroleum deposits appear to undergo diverse conditions of diffusion and migration through permeable faults, joints or minute fractures, principally adjacent the edges of a deposit, these discontinuities eventually exercise an influence on vegetation and cover soil at the earth's surface. Such influence is detectable as a fluorescence when radiated with ultraviolet energy. Thus, as taught by the Madsen patent, helicopter 10 would fly over the area to be surveyed while repetitively discharging pulses of radiant energy from ultraviolet sources 12. These stimulate the luminescence of the earth's surface and such luminescence is observed either by the camera 14, video camera 16 or observer 13. At the same time intermittent visible illumination is provided by light pod 18. However, this illumination from source 18 is interrupted intermittently or at periodic intervals to allow the various recording devices of the ultraviolet stimulated luminescence to function without the masking brightness of the visible illumination sources. The specific mode in which this is accomplished is more fully illustrated in FIG. 2 which will be discussed below.

From a broad standpoint, the undesirable masking brightness of the visible illumination may be produced by radiation which is in the frequency spectrum of the visible illumination itself or by reradiation from the material or surface caused by the visible illumination which would overlap with the stimulated luminescence radiation. In order to prevent this masking brightness in accordance with the present invention the illumination means 18 is intermittently interrupted and at the same time the means for receiving selective reradiation from the material or this ground surface 17 are unshuttered or unblocked to allow the stimulated luminescence to be received during periods when the radiation from the visible illumination sources 19 are not activated.

Referring now specifically to FIG. 2 there is illustrated the various components of the system of the present invention. The illumination sources 19 are activated through a trigger amplifier 22 which in turn is controlled by a synchronizer 23 coupled to it. Synchronizer 23 determines the rate at which the visible sources 19 are pulsed on and the time period of the pulse. Factors to be considered in determining this rate are reducing flicker to a minimum for the pilot of the aircraft while at the same time allowing sufficient time for reradiation from the ground or material being stimulated by the ultraviolet radiation.

Synchronizer 23 is coupled by a line 24 to an AND gate 25 which activates ultraviolet light sources 12 and a shutter mechanism 27 for camera 14. The other input to AND gate 25 is provided by a DC source 28 coupled to an input lead 29 through a series connected shutter actuator 31. In practice the shutter actuator would be automatically operated to open shutter switch 27 allowing the camera 14 to view the stimulated luminescence of the ground surface and at the same time activate ultraviolet sources 11 during non-illumination periods of illumination sources 19. Thus, synchronizing pulses from synchronizer 23 would be of a polarity during one mode such as to trigger amplifier 22 and at the same time maintain AND gate 25 in a closed condition. In its other mode the amplifier 22 would not be triggered and the synchronizing signal would serve as one of the coincidence inputs to gate 25 to open the gate to activate ultraviolet sources 12 and allow the shutter to film camera 14 to be opened to record the stimulated luminescence of the ground surface.

Synchronizer 23 is also coupled to shutters 32 and 33 driven by motors 34 and 35 respectively. Shutter 33 shutters a video camera 16 so that it receives light information from the ground surface only during period of ultraviolet stimulated luminescence. Shutter 32 is a representational showing of a shutter that would be placed over the viewing port or goggles of the observer 13 as shown in FIG. 1. In actual practice the shutters or goggles are preferably solid state and the synchronizing pulse of synchronizer 23 would merely provide an electrical input pulse to the goggles to blank them or shutter them at the appropriate times. Such a solid state light transmission means is manufactured by Marks Polarized Corporation and is termed a VARAD (trademark) dipole cell.

The video camera 16 is also coupled through synchronizer 23 to a monitor 36 which is normally mounted in the helicopter and in addition a video tape recorder 37 for recording the scenes recorded by video camera 16. Also coupled to video tape recorder 37 are a tone encoder 37 which receives the output of AND gate 25 and converts it into tones for providing additional information as to the closure or shuttering of the color film camera 14 and activation of ultraviolet sources 12. A microphone 39 coupled through switching unit 41 allows the observer on the helicopter to make oral observations. The tape recorder 37 is coupled to a ground station via air-ground links 42 and 43 to a ground monitor 44, a ground speaker 45, and a tone decoder 46 which serves the purpose of synchronizing a slide projector 47.

OPERATION

In operation the area to be surveyed is brightly illuminated by illumination sources 19 allowing the pilot of the helicopter to fly the airborne platform for the equipment at a relatively low altitude during the night time but still with safety. The visible illumination although formed of pulses of relatively short duration appears steady due to the eyes' retinal retention characteristics. However, the observer 13 with the special goggles 32 and the video camera 16 will only receive luminescence stimulated by ultraviolet sources 12. Similarly color film camera 14 only has its shutter open during periods of no visible illumination.

In order to supplement ultraviolet sources 12 a continuous ultraviolet radiation source 48 may be provided having a power supply 49.

Thus the helicopter operates in a brightly lighted environment and yet the exploration system operates in necessary darkness to be effective. The observer 13 who would normally be a geologist can see and relate both in the visible as well as the ultraviolet luminescence realm.

The above system is also more effective since the visible illumination allows the helicopter to fly relatively close to the ground thus increasing the intensity of ground radiation to increase the stimulated luminescence.

Although a ground surface 17 is illustrated in FIG. 1 in combination with the helicopter 10 the system of the present invention also has several other applications. For example, if a number of different articles are to be sorted visible illumination can be provided allowing workers in the area adjacent the articles to function in a lighted environment. Radiation from the ultraviolet source can provide a selective radiation with an observer wearing the special goggles who can then detect differences in the articles to thereby sort them. Thus, FIG. 1 could be modified so that the equipment located in the helicopter 10 would be in a fixed installation and the ground surface 17 would represent the plurality of articles to be sorted.

Similarly, in another application the ground surface 17 could actually be the operating field of a portion of the anatomy of a human being where, for example, the body portion has been treated with an aerosol fluorescing medium which would cause the medium to outline points or areas of discontinuity in the body. In other words, fluid dynamics would cause an aerosol spray to concentrate in the discontinuities and the stimulated luminescence caused by the impinging ultraviolet radiation would indicate to the observer-surgeon a higher intensity of luminescence at these points. In addition, for example, where there is a foreign particle in the body this foreign particle would have a different degree of luminescence relative to the body itself. For example, a glass particle embedded in an eye of a human being. With the system of the present invention the attending medical personnel would still be allowed to effectively function in the area adjacent the surgery.

Thus, the present invention has provided an improved system for delineating a selective response of a material to radiation in the presence of visible illumination. The material may be the ground surface for geologic exploration, a group of articles to be sorted or an operating field of the human body.

I claim:

1. A system for delineating the selective response of a material in a dark environment to impinging ultraviolet radiation while visibly illuminating said material comprising, a first source of electromagnetic radiation including the visible range directed towards said material for visibly illuminating said material, said radiation having frequencies lying within a predetermined electromagnetic frequency spectrum, a second source of electromagnetic radiation including the ultraviolet range directed towards said material for causing said material to selectively reradiate electromagnetic energy in a spectrum which overlaps with said predetermined frequency spectrum or with reradiation from said material caused by said first source, means for intermittently interrupting said visible radiation from said first source towards said material, and means for receiving said selective reradiation from said material during said interruptions.

2. A system as in claim 1 together with means for shuttering said means for receiving said selective reradiation during periods when radiation from said first source is being directed toward said material.

3. A system as in claim 1 in which said material includes portions of the earth's surface and said first and second sources are moved above said surface at a predetermined altitude.

4. A system as in claim 3 in which said first and second sources are attached to an airborne platform having a human pilot and said visible illumination allows said pilot to direct said platform.

* * * * *